(12) United States Patent
Combs

(10) Patent No.: US 6,536,582 B1
(45) Date of Patent: Mar. 25, 2003

(54) REVERSIBLE SHELF VERTICAL CONVEYOR

(76) Inventor: John Andrew Combs, 3112 Island View Dr., Ventura, CA (US) 93003

( * ) Notice: Subject to any disclaimer, the term of this patent is extended or adjusted under 35 U.S.C. 154(b) by 0 days.

(21) Appl. No.: 09/950,505

(22) Filed: Sep. 13, 2001

(51) Int. Cl.⁷ .......................... B65G 17/18; B65G 19/26
(52) U.S. Cl. ...................... 198/732; 198/733; 198/800
(58) Field of Search ................................. 198/728, 732, 198/733, 802, 800

(56) References Cited

U.S. PATENT DOCUMENTS

| | | | | |
|---|---|---|---|---|
| 795,124 A | * | 7/1905 | Hetzel | 198/732 |
| 3,110,391 A | * | 11/1963 | Warren | 198/732 |
| 3,664,482 A | * | 5/1972 | Kornylak | 198/802 |
| 4,130,196 A | * | 12/1978 | Schwab | 198/796 |
| 4,421,227 A | * | 12/1983 | Kornylak | 198/802 |
| 5,501,318 A | * | 3/1996 | Disrud | 198/732 |
| 6,378,693 B1 | * | 4/2002 | Ballestrazzi et al. | 198/732 |

\* cited by examiner

Primary Examiner—Douglas Hess

(57) ABSTRACT

A reversible shelf type vertical conveyor wherein a plurality of shelves are pivotally mounted between two endless chains that are driven by pairs of upper and lower sprockets, the shelves pivoted to a space saving vertical orientation during the return run and to a horizontal orientation during the working run. Positive control of the orientation of shelves is provided by pairs of rollers attached to the shelves which straddle a guide bars during the return run and ride within guide channels during the working run. During the transition between return and working runs at the top and bottom, shelves are held tight against bosses adjacent the sprockets. Each successive cycle pivots the shelves 180 degrees, and the shelves are symmetrical about their pivot axis.

2 Claims, 3 Drawing Sheets

REVERSIBLE SHELF VERTICAL CONVEYOR

CROSS REFERENCE TO RELATED APPLICATIONS

Not Applicable

FEDERALLY SPONSORED RESEARCH

Not Applicable

MICROFICHE APPENDIX

Not Applicable

BACKGROUND OF THE INVENTION

Movement of articles vertically between decks of a ship or floors of a building may be accomplished by vertical conveyor, which lifts or lowers shelves onto which the articles are placed. The shelves are suspended via one or more endless chains, which are driven by engaged sprockets. To reduce space requirements, it is desirable to pivot the shelves from the horizontal load carrying position to a vertical return position while the shelves travel along the return path of the endless chain(s). Stability of the shelves is highly desirable for conveying purposes. Rollers riding within tracks may accomplish control of the motion of individual shelves, both for stability and during the transition from horizontal to vertical.

Existing technology for vertical conveyors employ tilting shelves. The individual shelves are held horizontally during the working portion of their travel, and tilted to vertical for the return portion of travel. As such, the shelves are orientation sensitive, i.e. one side of the shelf is the top, and the other is the bottom. Control of the tilting motion of the shelves is usually accomplished by the use of two pairs of rollers, rigidly attached to the each end of the shelves, riding within guide tracks. Such tilting shelf conveyors, such as shown in U.S. Pat. No. 2,747,724 issued May 29, 1956 and U.S. Pat. No. 3,365,052 issued Jan. 29, 1968 employ tracks with either a crossover pattern or a cusp-section to temporarily halt and redirect a roller. Both methods are subject to jamming as rollers can engage the wrong track, or bypass the cusp section, when they are inadequately constrained within these transition zones. Additionally, the tracks are difficult to manufacture and expensive, due to the exacting tolerances required to minimize jamming.

BRIEF SUMMARY OF THE INVENTION

The present invention simplifies the mechanism of shelf motion control of vertical conveyors by allowing the shelves to be reversible rather than tilting, thus orientation insensitive. This results in reduced construction costs, and significantly greater reliability.

Control of shelf motion is provided by a pair(s) of rollers, rigidly fixed to one or both ends of each shelf, which ride within a straight channel track during the lifting phase, and straddle a straight track bar during the return phase. At the terminal ends of the lifting phase, the rollers exit the channel track while simultaneously the shelf itself comes into contact with the sprocket drum, causing it to rotate to parallel with the chain. Continued rotation of the sprocket reverses the direction of travel of the shelf, and the pair(s) of rollers then straddle the track bar for the return phase. Shelves entering the lift phase exit the sprocket drum before one of the rollers contacts the end of the channel track. Continued travel of the chain causes the shelf to rotate to the horizontal position, followed by both rollers entrance into the channel track.

DETAILED DESCRIPTION OF THE INVENTION

Generally, this type of conveyor is used aboard Naval Vessels and to facilitate movement of packages from several levels of storerooms to a level of package utilization. Additionally, packages are struck down to the storeroom levels from the upper terminus level. Naval vessels typically take on a large quantity of goods prior to a deployment and strike them down to the appropriate storeroom. Then, throughout the deployment, packages are retrieved from the storerooms and delivered vertically via the conveyor to the level of utilization. Usually, only one conveyor serves an area of a ship, so overall reliability of the conveyor is critical.

Figure 1:
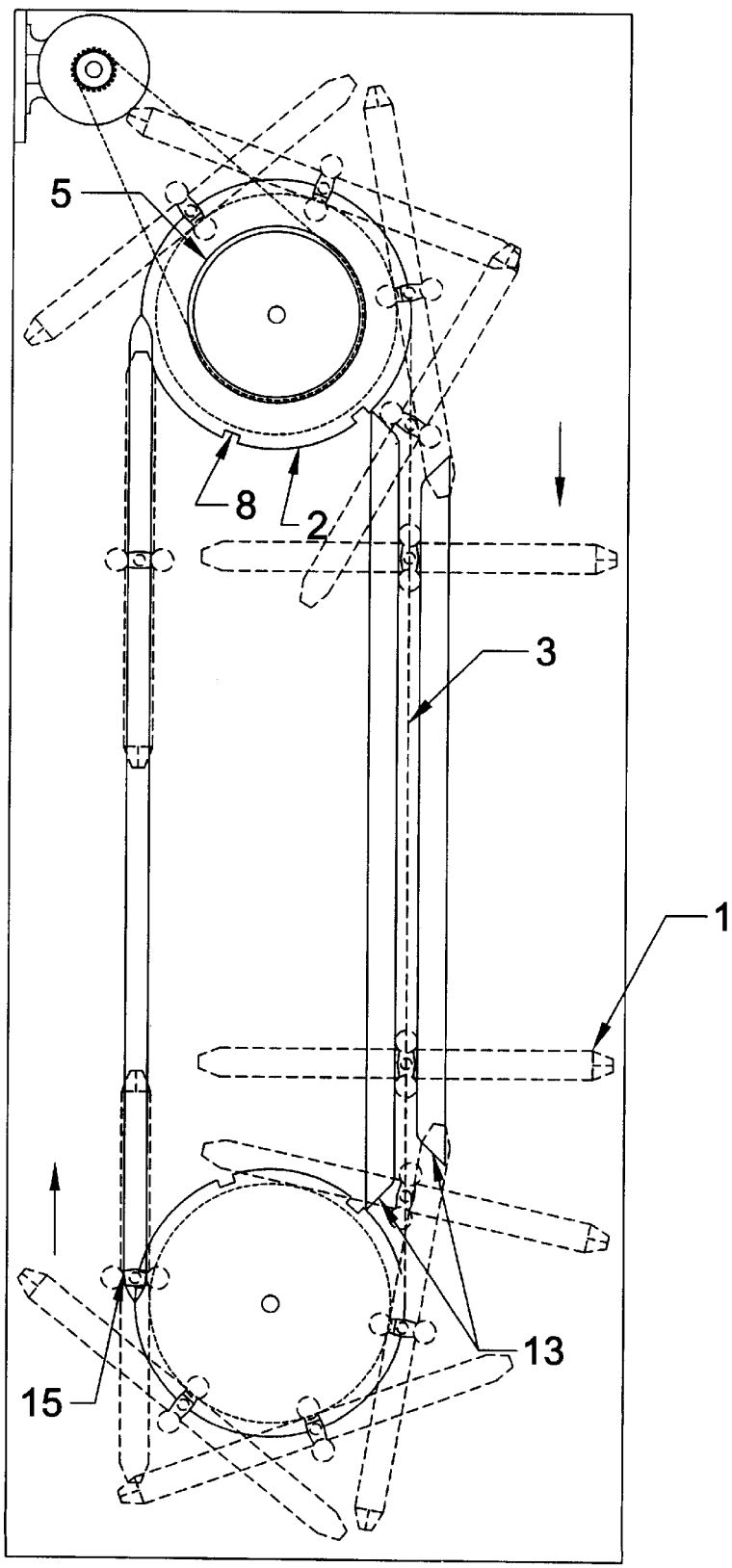
FIG. 1: This is a side view of the complete conveyor assembly.
Figure 2:
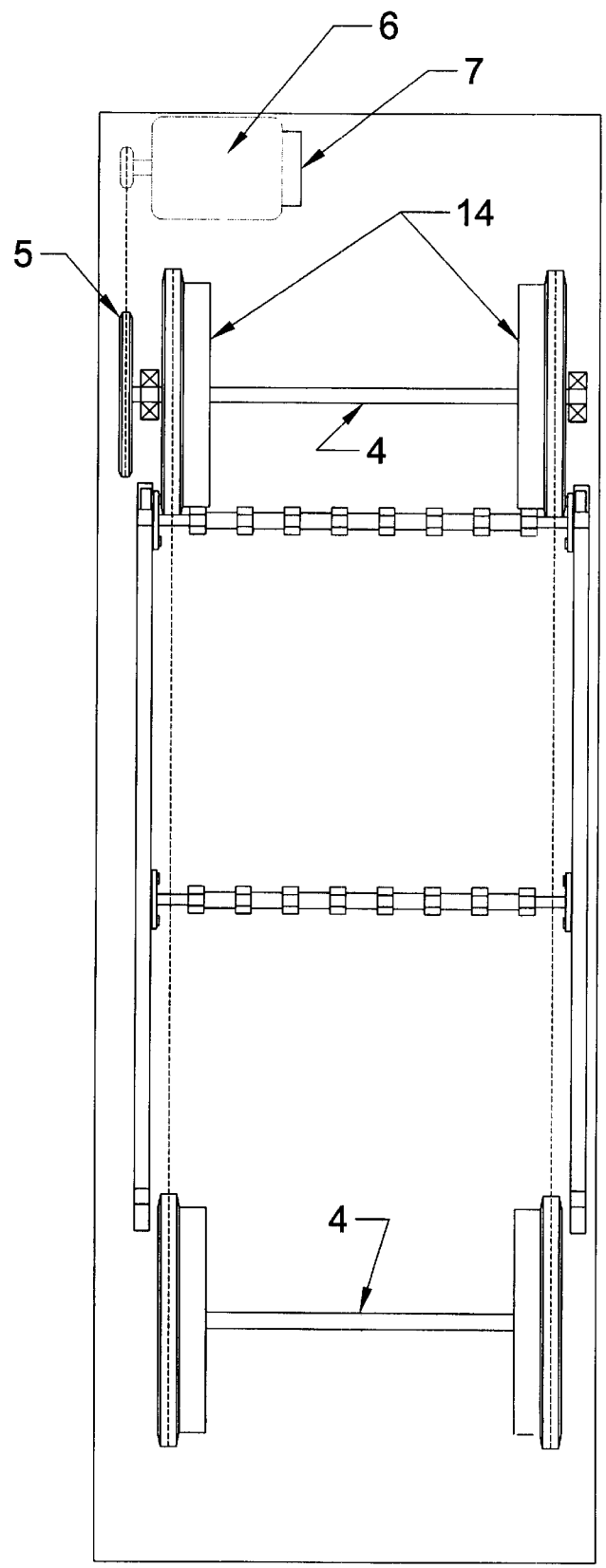
FIG. 2: This is a front view of the complete conveyor assembly.
Figure 3:
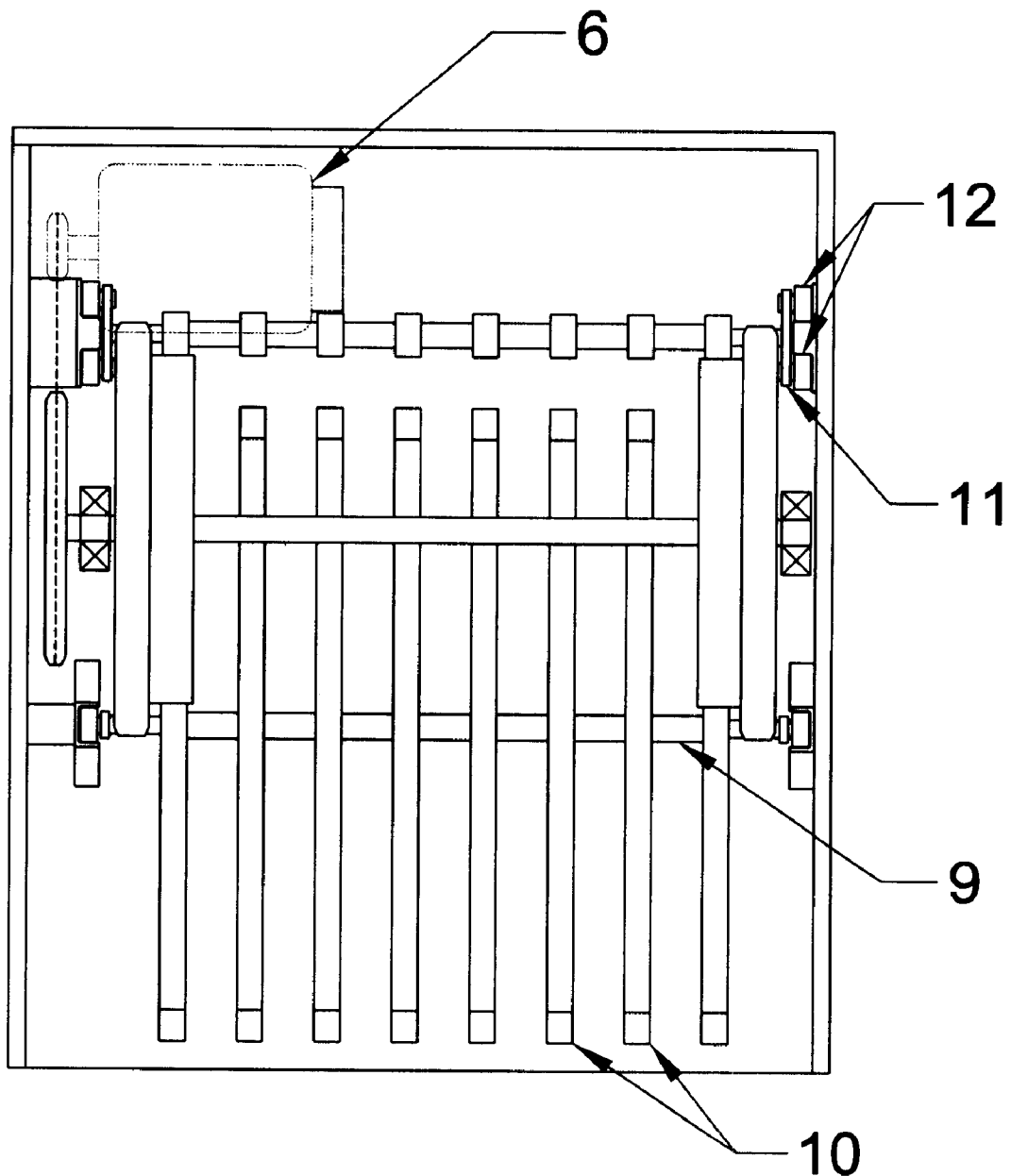
FIG. 3: This is a top view of the complete conveyor assembly.

The components of the conveyor are mounted within a rigid frame structure. Openings, spaced vertically throughout the structure allow access to the conveyor from the various levels served for loading/unloading of packages. As shown in FIGS. 1–3, the shelves (1) are oriented horizontally during the working portion of travel, and oriented vertically during the non-working portion of travel. At the upper and lower extents of travel are axle-mounted hoist sprockets (2) on which the endless hoist chains (3) ride. The upper and lower axles (4) rotate about a horizontal axis and are parallel. A drive sprocket (5) is mounted to one end of the upper axle, and is driven via an endless chain by a smaller sprocket mounted on an electric motor (6) shaft. The electric motor is equipped with a spring set, electrically released brake (7), which serves to secure the conveyor whenever power is not supplied to the motor.

The endless hoist chains are assembled from prescribed lengths of roller chain connected with support links. The distance between support links is determined by the spacing between levels served. The support links contain a journal to support the shelf and allow its rotation. The two endless hoist chains are identical, and are installed on their sprockets so that the pairs of support links are vertically aligned. The hoist sprockets are provided with relief pockets (8) to allow the support links, which are larger than the roller chain links, to be engaged.

The shelves are constructed of a horizontally oriented central shaft (9) to which multiple tines (10) are mounted. The tines serve as the platform on which packages are placed. The shelf is symmetrical about the central shaft. At either end of the central shaft are machined bosses, which ride within the journals of the support links, thus supporting the shelf itself. Outboard of the bosses are attached the control arms (11), to which the guide rollers (12) are mounted. Deflection of the guide rollers about the axis of the shelf causes the shelf to rotate correspondingly. The guide arms may be equipped with a breakaway feature to allow the shelf to rotate if personnel or material are caught between a moving shelf and a fixed structure. The breakaway feature is self-resetting, so that as the obstacle is cleared, the shelf returns to the position determined by the control arms.

As a shelf assembly travels up or down the working phase of the cycle, its guide rollers ride within a channel guide track (13). The channel guide tracks are rigidly mounted to the conveyor frame structure, with the centerline of each channel guide track outboard of and parallel to the path of the endless hoist chains. The channel guide tracks are constructed of a corrosion resistant material to allow them to be used without a protective coating. The inside width of the channel guide track is slightly greater than the diameter of the rollers, so that the rollers will contact only one side of the channel at a time.

When the shelf reaches the end of the working phase of the cycle, it also reaches the end of the channel guide tracks. Just as the horizontally oriented shelf tines begin to contact the sprocket drum (14), the rollers exit the channel guide track. Because the rollers are no longer constrained within the channel guide track, the shelf is free to rotate to a position flat against the sprocket drum and parallel to the endless hoist chain. Held snug against the sprocket drum the shelf is propelled around the hoist sprocket's path, and its direction is reversed.

At the same moment the shelf leaves the sprocket drum and enters the return phase, the roller pairs, now horizontally offset, engage and straddle the return guide bar (15). Like the channel guide track of the hoist phase, the return guide bar is rigidly mounted to the conveyor frame. The centerline of the return guide bar is outboard of and parallel to the return phase path of the hoist chain. The return guide bar is constructed of corrosion resistant material to allow its use without protective coating. The horizontal width of the return guide bar is the same as the distance between guide roller pairs, so that the shelf assembly is assuredly held in a vertical position throughout the return phase.

When the shelf reaches the end of the return phase of the cycle, the rollers also come to the end of the return guide bar. The shelf, already in a vertical orientation, arrives at the sprocket drum and is held tight against it. As the drum rotates through 180 degrees, the shelf arrives at the entrance to the hoist phase of the cycle. As the shelf begins to depart the sprocket drum, the guide roller nearest the sprocket contacts the end of the channel guide track. As the shelf center shaft continues along with the hoist chain, the impediment to the guide roller imparts rotation of the shelf assembly. As the shelf rotates, the guide roller travels around the radiused end of the channel guide track, and both rollers enter the channel proper. During each complete cycle the shelves rotate 540 degrees relative to a fixed position, thus the shelves "reverse" orientation each cycle.

The conveyor is equipped with operator controls at each level served. The controls allow the operator to dispatch the conveyor in either direction, and stop the conveyor each time a shelf arrives at his level.

What is claimed is:

1. A vertical shelf conveyor for transporting packages between multiple vertically separated stations, the conveyor comprising:

a pair of endless chains horizontally offset riding on sprockets fixed to rotating, vertically offset shafts;

an electric motor with an integral brake for driving one of the shafts;

a multitude of shelves equally spaced and rotatably supported by the endless chains by a pivot axis on the endless chains; and a pair of guide rollers attached to each end of each shelf that bear against guide rails controlling the orientation of the trays during vertical travel, wherein the orientation of each shelf is reversible, the shelves being symmetrical about their pivot axis, and the shelves rotating 540 degrees about their pivot axis during each conveyor cycle.

2. The vertical shelf conveyor of claim 1, wherein the orientation of the shelves at upper and lower turnarounds is controlled by contact of the shelves themselves against sprocket drum assemblies.

\* \* \* \* \*